United States Patent
Miyazaki et al.

(10) Patent No.: US 9,466,825 B2
(45) Date of Patent: Oct. 11, 2016

(54) APPARATUS THAT SANDWICHES ELECTRODE SHEET WITH SEPARATORS

(71) Applicant: NAGANO AUTOMATION CO., LTD., Nagano (JP)

(72) Inventors: Tsukasa Miyazaki, Nagano (JP); Seiji Yamaura, Nagano (JP)

(73) Assignee: Nagano Automation Co., Ltd. (JP)

( * ) Notice: Subject to any disclaimer, the term of this patent is extended or adjusted under 35 U.S.C. 154(b) by 0 days.

(21) Appl. No.: 14/397,795

(22) PCT Filed: Mar. 27, 2013

(86) PCT No.: PCT/JP2013/002096
§ 371 (c)(1),
(2) Date: Oct. 29, 2014

(87) PCT Pub. No.: WO2014/080544
PCT Pub. Date: May 30, 2014

(65) Prior Publication Data
US 2015/0129107 A1    May 14, 2015

(30) Foreign Application Priority Data

Nov. 21, 2012  (JP) .................................. 2012-255411

(51) Int. Cl.
*B32B 41/00* (2006.01)
*H01M 4/04* (2006.01)
(Continued)

(52) U.S. Cl.
CPC ................ *H01M 4/04* (2013.01); *B29C 65/02* (2013.01); *B32B 38/1841* (2013.01);
(Continued)

(58) Field of Classification Search
CPC .............. H01M 4/04; H01M 4/0471; H01M 10/0404; B29C 65/02; B29C 66/433; B29C 66/1122; B29C 66/83543; B29C 66/3452; B32B 38/1841; B32B 2457/10; B32B 2309/72; B32B 37/0076; B32B 38/1875; B32B 37/04; B32B 37/0046; B32B 37/22; B32B 38/0004; B29L 2031/3468; Y10T 156/1343; Y10T 156/1734
USPC ........... 156/60, 64, 350, 351, 353, 362, 363, 156/378, 379
See application file for complete search history.

(56) References Cited

U.S. PATENT DOCUMENTS 9,205,632 B2    12/2015    Aeschlimann et al.
2005/0016670 A1    1/2005    Kanbara et al.
(Continued)

FOREIGN PATENT DOCUMENTS

JP    2007242506 A    9/2007
JP    2007242507 A    9/2007
(Continued)

OTHER PUBLICATIONS

European Search Report for EP Application No. 13857300.1 dated Nov. 4, 2015, 11 pages.

*Primary Examiner* — Michael N Orlando
*Assistant Examiner* — Joshel Rivera
(74) *Attorney, Agent, or Firm* — Blank Rome LLP; Peter S Weissman

(57) ABSTRACT

An apparatus including: a first bonding unit that at least partially bonds a first separator strip and a second separator strip in a width direction at a first position; a first feeding unit that supplies the first separator strip to the first position; a second feeding unit that supplies the second separator strip to the first position so as to make an angle to the first separator strip; and a third feeding unit that supplies, in synchronization with timing of bonding of the first separator strip and the second separator strip in the width direction at the first position, an electrode sheet to the first position so as to be between the first separator strip and the second separator strip and make an angle to the first separator strip and the second separator strip respectively.

10 Claims, 9 Drawing Sheets

(51) Int. Cl.
*H01M 10/04* (2006.01)
*B32B 38/18* (2006.01)
*B29C 65/02* (2006.01)
*B32B 37/00* (2006.01)
*B32B 37/22* (2006.01)
*B32B 38/00* (2006.01)
*B32B 37/04* (2006.01)
*B29L 31/34* (2006.01)
*B29C 65/00* (2006.01)

(52) U.S. Cl.
CPC ..... *H01M 4/0471* (2013.01); *H01M 10/0404* (2013.01); *B29C 66/1122* (2013.01); *B29C 66/3452* (2013.01); *B29C 66/433* (2013.01); *B29C 66/83543* (2013.01); *B29L 2031/3468* (2013.01); *B32B 37/0046* (2013.01); *B32B 37/0076* (2013.01); *B32B 37/04* (2013.01); *B32B 37/22* (2013.01); *B32B 38/0004* (2013.01); *B32B 38/1875* (2013.01); *B32B 2309/72* (2013.01); *B32B 2457/10* (2013.01); *Y10T 156/1343* (2015.01); *Y10T 156/1734* (2015.01)

(56) References Cited

U.S. PATENT DOCUMENTS

| | | |
|---|---|---|
| 2014/0013585 A1 | 1/2014 | Yuhara et al. |
| 2014/0013586 A1 | 1/2014 | Yuhara et al. |
| 2014/0013597 A1 | 1/2014 | Yuhara et al. |
| 2014/0059875 A1 | 3/2014 | Yuhara et al. |

FOREIGN PATENT DOCUMENTS

| | | | |
|---|---|---|---|
| JP | 2012129098 A | * | 7/2012 |
| JP | 2012221710 A | | 11/2012 |
| JP | 2012221711 A | | 11/2012 |
| JP | 2012227124 A | | 11/2012 |
| WO | WO-03/075375 A2 | | 9/2003 |
| WO | WO-2012/003595 A1 | | 1/2012 |
| WO | WO-2012/137906 A1 | | 10/2012 |

* cited by examiner

APPARATUS THAT SANDWICHES ELECTRODE SHEET WITH SEPARATORS

RELATED CASES

The present application is a national stage of PCT/JP2013/058906, filed Mar. 27, 2013, which claims priority of the Japanese patent application 2012-255411 of Nov. 21, 2012. The content of those applications are hereby incorporated by reference.

TECHNICAL FIELD

The present invention relates to an apparatus that sandwiches a positive electrode sheet or a negative electrode sheet with separators.

BACKGROUND ART

The object of Japanese Laid-Open Patent Publication No. 2007-242507 (Document 1) is to establish a mass production technology for laminated lithium ion cells, to provide a technology and manufacturing apparatus that efficiently mass produce electric cell laminated structures and also to provide a laminated lithium ion cell that can be mass produced, has a low cost, and is high quality with a low self-discharge rate. Document 1 discloses that electric cell laminated structures for laminated lithium ion cells are manufactured automatically and in large numbers by alternatively laminating naked negative electrode plates (or positive electrode plates) and opposing bagged positive electrode plates (or negative electrode plates), which have been manufactured by a method of manufacturing where a "thermally-bonded separator belt in which electrode plates have been inserted" is formed using an apparatus where a belt conveyor is combined with three types of roll and the "thermally-bonded separator belt in which electrode plates have been inserted" is cut at a "cutting location" of a pickup apparatus provided on a belt conveyor.

DISCLOSURE OF THE INVENTION

The electrode structure used in a lithium cell or the like is manufactured by laminating (stacking) a plurality of positive electrode sheets (positive electrode plates) and negative electrode sheets (negative electrode plates) with separators in between. In a method of manufacturing that uses packaged or bagged electrodes, that is, members in a state where electrode plates (electrode plates (electrode sheets), positive electrode plates (positive electrode sheets), or negative electrode plates (negative electrode sheets) are sandwiched in advance by separators, it would be desirable to supply bagged electrode sheets that have even higher positional precision for the electrode sheets inside the bag-like separators and are therefore more suited to manufacturing an electrode structure. One aspect of the present invention is an apparatus including a first bonding unit that at least partially bonds a first separator strip and a second separator strip in a width direction at a first position. The apparatus further includes: a first feeding unit that supplies the first separator strip to the first position; a second feeding unit that supplies the second separator strip to the first position so as to make an angle to the first separator strip; and a third feeding unit that supplies, in synchronization with timing of bonding of the first separator strip and the second separator strip in the width direction at the first position, an electrode sheet to the first position so as to be between the first separator strip and the second separator strip and make an angle to the first separator strip and the second separator strip respectively.

Another aspect of the present invention is a method including manufacturing a bonded component where a first separator strip and a second separator strip are bonded at least part of a circumference of an electrode sheet sandwiched therebetween. This method may be a method of manufacturing an electrode assembly, a method of manufacturing a cell including an electrode assembly, and a control method of the apparatus described above. Manufacturing the bonded component includes the following steps.

1. Supplying the first separator strip to a first position, supplying the second separator strip to the first position so as to make an angle to the first separator strip and at least partially bonding the first separator strip and the second separator strip in the width direction at the first position (a step of bonding in the width direction).
2. Supplying, in synchronization with timing of bonding of the first separator strip and the second separator strip in the width direction at the first position, an electrode sheet to the first position so as to be between the first separator strip and the second separator strip and make an angle to the first separator strip and the second separator strip respectively (a step of supplying an electrode sheet).

When manufacturing a packaged or bagged electrode, a method of reliably inserting an electrode sheet into separators formed in advance into a bag needs to be a bag of somewhat larger size than the electrode sheet. This means that it is difficult to improve the positional precision of the electrode sheet inside the bag-like separator. With a method of placing an electrode sheet on a separator and molding into a bag in a sandwiched state, it is necessary to expect a certain amount of error in order to avoid the electrode sheet inside the separators and weld only the separators. Accordingly, it is difficult to improve the positional precision of an electrode sheet inside a bag-like separator (a separator converted into a bag).

In the apparatus and method described above, the electrode sheet is supplied, from a different angle, to the first position where the separators are bonded by thermal bonding (heating) or the like, in synchronization with the timing at which separators are bonded. Accordingly, it is not necessary to insert the electrode sheet into a separator molded into a bag in advance and it is not necessary to bond the separators in a state where the electrode sheet is sandwiched. This means that it is possible to improve the positional precision of an electrode sheet inside a bag-like separator. In addition, since the electrode sheet is supplied to the first position where the separators are bonded from a different angle in synchronization with the timing at which the separators are bonded, it is possible to improve the positional precision of the electrode sheet inside the bag-like separator.

It is desirable for the third feeding unit to include a feeder that intermittently supplies the electrode sheet to the first position at a higher speed than a feeding speed of the first separator strip and the second separator strip. It is possible to supply an electrode sheet using the feeder so that a front end of the electrode sheet reaches the first position immediately after the first separator strip and the second separator strip have been bonded at the first position. This means that it is possible to reduce the clearance between a part where the separators are bonded and the electrode sheet and to improve the positional precision of an electrode sheet in a bag-like separator.

It is desirable for the apparatus to include a control unit that supplies an electrode sheet using the feeder so that a front end of the electrode sheet reaches the first position immediately after the first separator strip and the second separator strip have been thermally-bonded (bonded with heat) at the first position. It is also desirable for the process of supplying an electrode sheet to include intermittently supplying the electrode sheet to the first position at a higher speed than a feeding speed of the first separator strip and the second separator strip so that a front end of the electrode sheet reaches the first position immediately after the first separator strip and the second separator strip have been bonded at the first position.

It is desirable for the apparatus to also include a second bonding unit that at least partially bonds, at a second position that is downstream of the first position, the first separator strip and the second separator strip along at least one edge of the first separator strip and the second separator strip in synchronization with the first bonding unit. It is also desirable for the process of manufacturing a bonded component to include bonding, at a second position that is downstream of the first position, the first separator strip and the second separator strip along at least one edge of the first separator strip and the second separator strip in synchronization with the at least partially bonding in the width direction (a step of bonding along an edge). By bonding the separator strips in the longitudinal direction along the edges, it is possible to wrap an electrode sheet using separators.

The first and second bonding units may be types that operate linearly in synchronization. Also, the first bonding unit and the second bonding unit may be a rotary type. It is preferable for the bonding units to be a rotary type and for the apparatus that includes a feeding roller that conveys the first separator strip and the second separator strip at a third position downstream of the second position to include a unit that carries out draw control over the first bonding unit, the second bonding unit, and the feeding roller.

In a state where the position of an electrode sheet inside a bag-like separator is decided at the first position, it is possible to convey sandwiched electrode sheet in the first separator strip and the second separator strip with the draw control to the second position. By using a rotary-type bonding unit, it is possible to precisely bond predetermined positions along the edges of the separator strips.

It is also desirable for the method of manufacturing a bonded component to further include feeding the first separator strip and the second separator strip using a feeding roller at a third position downstream of the second position and draw control over the first bonding unit, the second bonding unit, and the feeding roller.

It is desirable for the bonding unit to be a unit that bonds the separator strips without using another member (e.g., adhesive), such as a unit that bonds by thermo-compression, mechanical deformation and the like. It is possible to suppress any effects on the performance of the cell. A typical example of a bonding unit is a thermal bonding (thermal fusion bonding, welding) unit that bonds the first separator strip and the second separator strip by thermal fusion. It is desirable for the apparatus to further include a sensor group that detects passage of a part bonded by thermal fusion, and for the unit that carries out draw control to include a function of determining a draw value according to passage of the thermally-bonded parts.

The separator may be marked using a method such as an ink jet and it is also possible to add perforations or the like for marking purposes. However, it is necessary to increase the positional precision of the bonded parts and the marking, and there is the possibility of snapping due to tension if perforations or the like are added. At parts where the separators are bonded by thermal fusion, there is a change in the color, translucency, or reflectivity. Accordingly, it is possible to directly detect the bonded part using an optical sensor and to control the draw value according to the passage of the bonded parts.

It is also desirable for the apparatus to further include a cutter that detects a part bonded thermally and cuts the first separator strip and the second separator strip at substantially a center of the part bonded by thermally. When thermally bonding, it is possible to detect the bonded parts using an optical sensor, as described above. This means that by detecting a bonded part immediately before the cutter and cutting at substantially the center of the bonded part, it is possible to further improve the positional precision of an electrode sheet inside a bag-like separator.

Also, it is desirable for manufacturing the bonded component in the method of manufacturing or the like to also include detecting a part bonded thermally and cutting the first separator strip and the second separator strip at substantially a center of the part bonded thermally.

Also, it is preferable for the apparatus to include a feeding conveyor that supplies the electrode sheet to the third feeding unit. The feeding conveyor includes: a first unit that forms a first conveying surface on which the electrode sheet is loaded in a state where the electrode sheet is capable of moving in a direction from upstream toward the third feeding unit located downstream; and a second unit that forms a second conveying surface that guides the electrode sheet in a state where the electrode sheet is capable of moving in a direction from upstream toward downstream along a first edge of the first conveying surface. In addition, the second conveying surface includes a first region disposed below the first conveying surface and a second region that is a region continuous with the first region and is disposed above the first conveying surface.

The first region of the second conveying surface of the feeding conveyor is disposed below the first conveying surface. This means that the first region does not contact the electrode sheets placed on the first conveying surface. However, by providing a first region that is continuous with the second region, it is possible, even with an electrode sheet in the form of a thin plate, to place the electrode sheet reliably in contact with the second region of the second conveying surface and guide the electrode sheet. This means that it is possible to align a thin electrode sheet in a predetermined orientation while conveying on the first conveying surface and the second conveying surface and to reduce the time required for alignment.

This feeding conveyor can also be provided as a general purpose conveying and/or feeding apparatus that not only conveys an electrode sheet to the third feeding unit but also conveys other thin objects. A conveying or feeding apparatus of this type may convey, not limited to electrode sheets, a member, a component, goods, or a product in the form of a thin plate or a sheet to a predetermined position and straightening (aligning) such thin objects to a predetermined posture when outputting from the conveyor.

DETAIL DESCRIPTION

Figure 1:
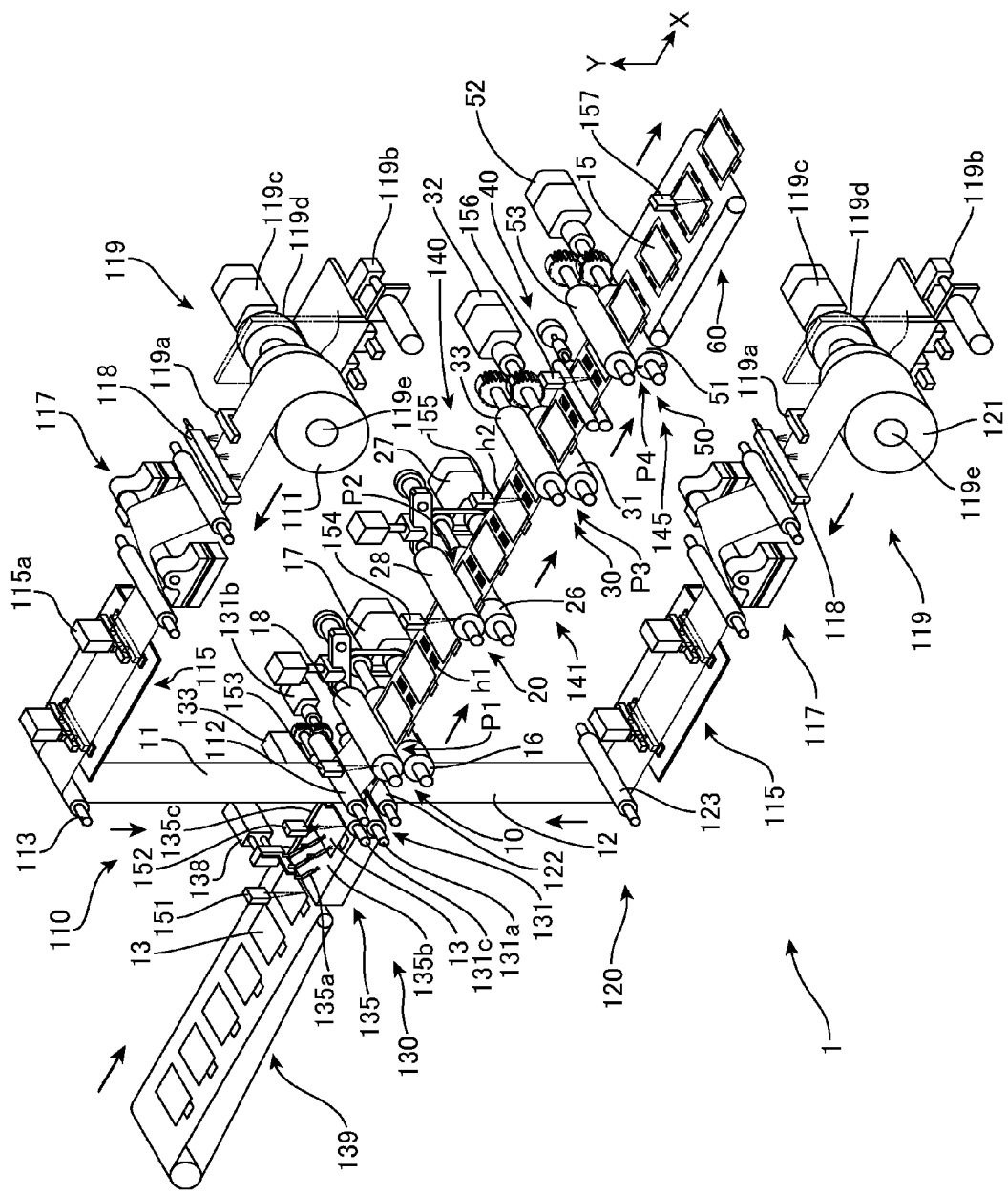
FIG. 1 is a diagram showing the overall layout of a wrapping apparatus.

FIG. 1 shows the overall configuration of an apparatus that wraps electrodes. The wrapping apparatus 1 is an apparatus that wraps an electrode sheet 13 by sandwiching the electrode sheet 13 between a first separator strip (separator band, separator belt) 11 and a second separator strip (separator band, separator belt) 12 and bonding the separators using a first bonding unit 10 and a second bonding unit 20. The electrode sheet 13 is typically a positive electrode sheet (positive electrode sheet), but may be a negative electrode sheet (negative electrode sheet). The apparatus 1 includes the first bonding unit 10 that bonds the first separator strip 11 and the second separator strip 12 at a first position P1, a first feeding unit 110 that supplies the first separator strip 11 to the first position P1, a second feeding unit 120 that supplies the second separator strip 12 to the first position P1, and a third feeding unit 130 that supplies electrode sheets 13 to the first position P1, a wrapping unit 140 that includes the first bonding unit 10 and is positioned downstream thereof, and a feeding conveyor 139 that conveys electrode sheets 13 to the third feeding unit 130.

The first feeding unit 110 includes, in order from the upstream side, a tension controller 119 that controls the pulled-out amount of a separator roll 111, an ionizer 118 that processes the first separator strip 11 using atmospheric pressure discharge plasma, a tension sensor 117, a separator splicing unit 115, and guide rollers 113 and 112. The tension controller 119 is equipped with an edge position control function and includes a sensor 119a that detects an edge position, an edge position control driving unit 119b, a tension control motor 119c, a tension control powder clutch 119d, and an air shaft 119e that controls rotation of the separator roll 111.

The tension sensor 117 is a stepped roller type, and controls the relative positions of a plurality of rollers so as to apply an appropriate tension (back tension) to the separator strip 11. A plurality of separator pressing cylinders 115a are disposed in the separator splicing unit 115, which makes it possible to temporarily hold the first separator strip 11, to replace the roll 111, and to splice the separator strip 11.

The guide rollers 113 and 112 are rollers that control the feeding direction of the separator strip 11. The guide roller 113 changes the direction of the separator strip 11 supplied to a direction Y that is perpendicular to the direction X along which the electrode sheets 13 is supplied so that the separator strip 11 is fed from the top toward the bottom in the Y direction. The guide roller 112 changes the supplying direction of the separator strip 11 to a direction that is inclined by an angle θ in the clockwise direction (+θ) to the supplying direction X.

The second feeding unit 120 has the same configuration as the first feeding unit 110. The second feeding unit 120 includes a tension controller 119 that controls the pulled-out amount of the separator roll 121, an ionizer 118 that processes the separator strip 12 using atmospheric pressure discharge plasma, a tension sensor 117, a separator splicing unit 115, and guide rollers 123 and 122. The guide roller 123 changes the supplying direction of the separator strip 12 so that the second separator strip 12 is supplied in the direction Y that is perpendicular to the direction X along which the electrode sheets 13 supplied and in a direction from the bottom toward the top, which is the opposite to the supplying direction of the separator strip 11. The guide roller 122 changes the supplying direction of the separator strip 12 to a direction that is inclined by an angle θ in the counter-clockwise direction (−θ) to the supplying direction X.

The third feeding unit 130 supplies cut electrode sheets 13 that are supplied from the feeding conveyor 139 to the first position P1 where the separators are bonded. The third feeding unit 130 includes an electrode sheet feeder 131 that supplies the electrode sheets 13 at high speed to the first position P1, an air floating/micro-inclining table (air floating table) 135 equipped with a buffering function and alignment adjustment function for when the electrode sheets 13 are supplied from the electrode sheet conveyor 139 to the electrode sheet feeder 131, a first electrode sheet escape cylinder (first gate) 138 that controls the timing at which the electrode sheets 13 are supplied from the feeding conveyor 139 to the air floating table 135, and a second electrode sheet escape cylinder (second gate) 133 that controls the timing at which the electrode sheets 13 are supplied from the air floating table 135 to the electrode sheet feeder 131.

The air floating/micro-inclining table 135 includes an inclined surface 135b that is inclined by a small angle to a convex guide 135c that decides the position of an edge of an electrode sheet 13; and a nozzle 135a for blowing air to the electrode sheet so as to levitate the electrode sheet 13 above the inclined surface 135b and convey the electrode sheet 13 toward the electrode sheet feeder 131. At the air floating/micro-inclining table 135, an electrode sheet 13 that has been aligned by the guide 135c stands by in a floating state where the electrode sheet 13 can be discharged at any time toward the electrode sheet feeder 131 using compressed air discharged from the nozzle 135a in the feeding direction (X direction) along the inclined surface 135b.

The electrode sheet feeder 131 includes a feed roller 131a, a servo motor 131b that rotationally drives the feed roller 131a, and an auxiliary roller 131c. In the electrode sheet feeder 131, the feed roller 131a constantly rotates, when a second gate 133 opens and an electrode sheet 13 is fed from the air floating table 135, the electrode sheet 13 is nipped between the feed roller 131a and the auxiliary roller 131c and the electrode sheet 13 is sent out toward the first position P1 at a higher speed than the separator strips 11 and 12.

The third feeding unit 130 further includes a first sensor 151 that detects the edge of an electrode sheet 13 on the feeding conveyor 139, a second sensor 152 that detects the edge of an electrode sheet 13 on the air floating table 135, and a third sensor 153 that detects the edge of an electrode sheet 13 supplied from the electrode sheet feeder 131. Such sensors 151 to 153 optically detect the front end or the rear end of an electrode sheet 13. The sensors 151 to 153 may detect the position of an electrode sheet 13 using image analysis or a mechanical method.

The wrapping unit 140 wraps and bags the electrode sheet 13 fed by the third feeding unit 130 using the first separator strip 11 supplied from above by the first feeding unit 110 and the second separator strip 12 supplied from below by the second feeding unit 120. The wrapping unit 140 includes a thermal-bonding-line system 141 that sandwiches the electrode sheet 13 between the first separator strip 11 and the second separator strip 12 and bonds the separators by thermal bonding; and a cutting unit 145 that cuts the separators that have been thermally-bonded together.

The thermal-bonding-line system 141 includes, in order from a position (the first position P1) where thermal bonding (fusion bonding, welding) is first carried out, the first bonding unit (first thermal bonding unit, lateral thermal bonding unit) 10 that forms first thermally-bonded parts h1 by bonding the separators together in the horizontal direction thermally, the second bonding unit (second thermal bonding unit, longitudinal thermal bonding unit) 20 that forms second thermally-bonded parts h2 by thermally bonding the edges of the separators together in the supplying direction (X direction), and a film feeding unit (film feeder) 30 that conveys the separator strips 11 and 12 that have been thermally-bonded together and include the electrode sheets 13.

The cutting unit 145 includes a rotary encoder 40 for synchronize and coordinate operation of the thermal-bonding-line system 141 and operation of a rotary cutter 50 positioned downstream, the rotary cutter 50 that cuts the thermally-bonded first separator strip 11 and the second separator strip 12 at the first thermally-bonded parts h1, and the conveyor 60 that unloads wrapped electrodes 15 that have been cut.

The first thermal bonding unit 10 is a rotary type and includes a rotary heater (heat roller) 16 that heats the tape-like first separator strip 11 and the second separator strip 12 in the width direction (lateral direction), a servo motor 17 that rotationally drives the rotary heater 16, and an auxiliary roller 18. The rotary heater 16 includes heating regions (not shown) that extend in the axial direction at positions with rotational symmetry.

Note that although an example where thermal fusion bonding is carried out using a rotary heater is described below, the method of fusion-bonding the separators is not limited to heating and it is also possible to use another method such as ultrasound or a laser. Also, the method of bonding the separators (method of sticking, method of joining) is not limited to thermal bonding and it is also possible to use a method that does not involve melting, such as thermo-compression bonding, or a method that bonds the separators by mechanical deformation, such as a staple-free stapler. Although it is also possible to use a method of bonding the separators using an agent, as such adhesive, it is preferable to use an agent that does not affect the performance of the cell or an agent that is the same as the electrolyte.

The second thermal bonding unit 20 includes a rotary heater (heat roller) 26 that carries out heating in the longitudinal direction along the edges of the tape-like first separator strip 11 and the second separator strip 12 at the second position P2 that is downstream of the first position P1, a servo motor 27 that rotationally drives the rotary heater 26, and an auxiliary roller 28. The rotary heater 26 includes a heating region (not shown) that extends in the circumferential direction.

The film feeder 30 functions as a feeding roller that conveys the first separator strip 11 and the second separator strip 12 at the same time at a third position P3 downstream of the second position P2. The film feeder 30 includes a drive roller 31, a servo motor 32 that rotationally drives the drive roller 31, and an auxiliary roller 33.

The rotary cutter 50 cuts the first separator strip 11 and the second separator strip 12 at the same time in a bonded state at the fourth position P4 downstream of the third position P3. The rotary cutter 50 includes a cutter 51 including teeth that extend in the axial direction at positions with rotational symmetry, a servo motor 52 that rotationally drives the cutter 51, and an auxiliary roller 53.

In addition, the wrapping unit 140 includes a fourth sensor 154 disposed upstream of the second thermal bonding unit 20, a fifth sensor 155 disposed upstream of the film feeder 30, a sixth sensor 156 disposed upstream of the rotary cutter 50, and a seventh sensor 157 that monitors the removal conveyor 60. The fourth sensor 154, the fifth sensor 155, and the sixth sensor 156 are sensors that optically detect the first thermally-bonded parts h1 formed in the width direction (lateral direction) of the separator strips 11 and 12 by the first thermal bonding unit 10.

The separator strips (band-like or belt-like separator) 11 and 12 prevent short circuits between the electrode sheets and may have a function of holding electrolyte. The separator strips 11 and 12 are microporous films which are composed of a polyolefin such as polyethylene (PE) and polypropylene (PP), and have a function whereby when an overcurrent flows, the pores in the film are closed by the resulting heat so as to interrupt the current. The separators are not limited to single layer films of polyolefin or the like, and it is also possible to use a three-layer structure where a polyethylene layer is sandwiched by polypropylene layers and a laminated structure of a microporous polyolefin film, an organic non-woven fabric, and the like.

The materials that construct the separator strips 11 and 12 exhibit a change when heated to the fusion-bonding temperature, such as 120 to 140° C., by discoloring or by changing from opaque to translucent. Accordingly, it is possible to detect the first thermally-bonded parts h1 using an appropriate optical sensor. This means that by detecting that the first thermally-bonded parts h1 have passed, it is possible to detect the movement speed of the separator strips 11 and 12 locally or remotely. Also, by detecting that the first thermally-bonded parts h1 have passed, it is possible to finely adjust the timing at which the first thermally-bonded parts h1 is cut by the rotary cutter 50.

Note that one type of electrode sheet (electrode plate) 13 that constructs an electrode structure (electrode core) of a lithium cell is a positive electrode sheet (positive electrode plate). A positive electrode sheet (positive electrode plate) is produced by applying a positive electrode activator, which includes a positive electrode active material such as lithium-nickel oxide ($LiNO_2$), a conductive material such as carbon black, and an adhesive such as an aqueous dispersion of polytetrafluoroethylene, onto both surfaces of metal foil, such as aluminum foil, as a positive electrode collector, drying, rolling, and then cutting to a predetermined size.

Another type of electrode sheet 13 is a negative electrode sheet (negative electrode plate). A negative electrode sheet (negative electrode plate) is produced by applying a negative electrode activator, onto both surfaces of metal foil, such as nickel foil or copper foil, as a negative electrode collector, drying, rolling, and then cutting to a predetermined size. The negative electrode activator includes a negative electrode active substance (such as amorphous carbon) that occludes and releases lithium ions of the anode active material. The electrode sheet 13, that is, the positive electrode sheet or negative electrode sheet, is not limited to an electrode structure of a lithium cell and may be an electrode structure of another type of cell or may be an electrode structure of a fuel cell.

Figure 2:
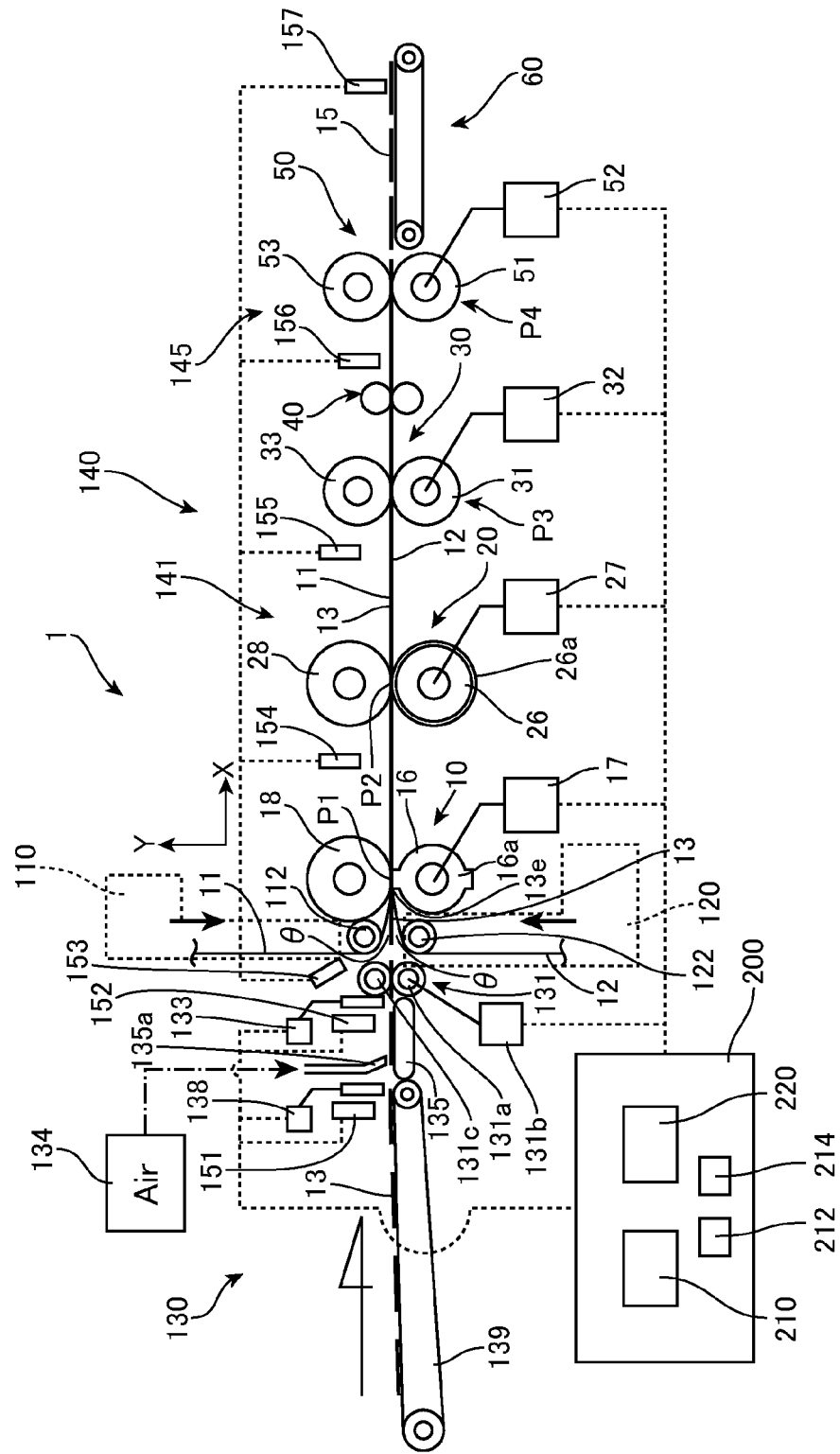
FIG. 2 is a block diagram of a wrapping apparatus.

FIG. 2 is a block diagram of the wrapping apparatus 1. The wrapping apparatus 1 includes a control unit 200 that controls the various apparatuses that compose the first feeding unit 110, the second feeding unit 120, the third feeding unit 130, and the wrapping unit 140. The control unit 200 includes computer resources such as a CPU and memory. The control unit 200 controls the various units of the wrapping apparatus 1 according to a program (program product). The control unit 200 includes an electrode sheet supplying control function (electrode sheet supplying control unit, supplying control unit) 210 that feeds an electrode sheet 13 using the electrode sheet feeder 131 at appropriate timing to the first position P1 where the separators are bonded; and a draw control function (draw control unit) 220 that controls the feeding amount of the wrapping unit 140.

The supplying control unit 210 controls the appliances that compose the third feeding unit 130 to supply an electrode sheet 13 to the first position P1 in synchronization with the timing at which the separator strips 11 and 12 are bonded. More specifically, the supplying control unit 210 conveys the electrode sheets 13 in the X direction using the electrode sheet feeder 131 so that the front end 13e of an electrode sheet 13 reaches the first position P1 immediately after the first separator strip 11 and the second separator strip 12 have been thermally-bonded together at the first position P1.

To do so, the supplying control unit 210 opens the second gate 133 between the air floating table 135 and the electrode sheet feeder 131 of the third feeding unit 130 at an appropriate time t1. As a result, the electrode sheet 13, which is standing by in a state where the electrode sheet 13 is slightly floating above the air floating table 135 due to air supplied from an air source 134, is fed into the electrode sheet feeder 131. The electrode sheet 13 fed into the electrode sheet feeder 131 is accelerated while being nipped between the feed roller 131a and the auxiliary roller 131c and is conveyed in the X direction.

The rotary heater 16 of the first thermal bonding unit 10 includes one or a plurality of thermal bonding regions 16a. The rotational speed of the rotary heater 16 is constant or controlled, thermal bonding (lateral bonding) is carried out at the first position P1 with a predetermined cycle. The rotary heater 16 according to the present embodiment includes two thermal bonding regions 16a at positions that have rotational symmetry (positions that are 180° apart). Thermal bonding is carried out every half turn of the rotary heater 16, the first and second separator strips 11 and 12 are thermally-bonded, and first thermally-bonded parts h1 that extend in the width direction are formed.

A time T from the opening of the second gate 133 until the electrode sheet 13 is conveyed by the electrode sheet feeder 131 and the front end 13e of the electrode sheet 13 reaches the first position P1 is set in advance in the supplying control unit 210. In synchronization with the cyclical thermal bonding by the first thermal bonding unit 10, the supplying control unit 210 opens the second gate 133 at a time t1 which is the time T earlier than the timing at which the first thermally-bonded part h1 is to be formed and supplies an electrode sheet 13 to the electrode sheet feeder 131.

As a result, at timing that barely differs to the formation of the first thermally-bonded part h1 at the first position P1 at substantially the same time or immediately after), the front end 13e of an electrode sheet 13 reaches the first position P1. After that, the first thermal bonding unit 10 feeds the first separator strip 11 and the second separator strip 12 in the X direction by nipping with the sub-roller 18 and other parts of the rotary heater 16 from the thermal bonding regions 16a. Accordingly, the electrode sheet 13 is sandwiched between the first separator strip 11 and the second separator strip 12 in a state where the front end 13e has almost contacted the first thermally-bonded parts h1 and is conveyed together with the first separator strip 11 and the second separator strip 12 toward the second bonding unit 20 located downstream.

The supplying control unit 210 has a function that confirms the state where the electrode sheet 13 supplied to the first position P1 is being conveyed together with the first and second separator strips 11 and 12 using the third sensor 153. In addition, the supplying control unit 210 includes a function that confirms the state (standby condition) of the electrode sheet 13 upstream of the second gate 133 using the second sensor 152 and a function that confirms the state of the electrode sheet 13 upstream of the first gate 138 using the first sensor 151.

Upstream of the first position P1, the first separator strip 11 is feeding by the guide roller 112 of the first feeding unit 110 so as to be inclined by the angle θ in the clockwise direction to the X direction in which the electrode sheet 13 is supplied. The second separator strip 12 is feeding by the guide roller 122 of the second feeding unit 120 so as to be inclined by the angle θ in the counter-clockwise direction to the X direction in which the electrode sheet 13 is supplied. Accordingly, in the wrapping apparatus 1, the second separator strip 12 is supplied to the first position P1 so as to be inclined in the Y direction (a direction perpendicular to the supplying direction of the electrode sheet 13) by the angle 2θ relative to the first separator strip 11. In addition, the electrode sheet 13 is supplied to the first position P1 between the first separator strip 11 and the second separator strip 12 so as to make the angle θ in the Y direction to the respective separator strips.

This means that in the wrapping apparatus 1, the electrode sheet 13 is conveyed to the first position P1 separately to the first separator strip 11 and the second separator strip 12 and does not contact the first separator strip 11 and the second separator strip 12 until the first position P1 is reached. Accordingly, it is possible to feed the electrode sheet 13 at a fast speed that differs to the feeding speeds of the separator strips 11 and 12 to the first position P1 where the separator strips 11 and 12 are thermally-bonded. This means that it is possible to precisely enclose the electrode sheet 13 at a position where the separator strips 11 and 12 are thermally-bonded, that is, a position that contacts or is adjacent to the first thermally-bonded parts h1. In this way, in the apparatus 1, it is possible to improve the positional precision of the electrode sheet 13 inside the separator strips 11 and 12 that form a bag or a package.

Figure 3:
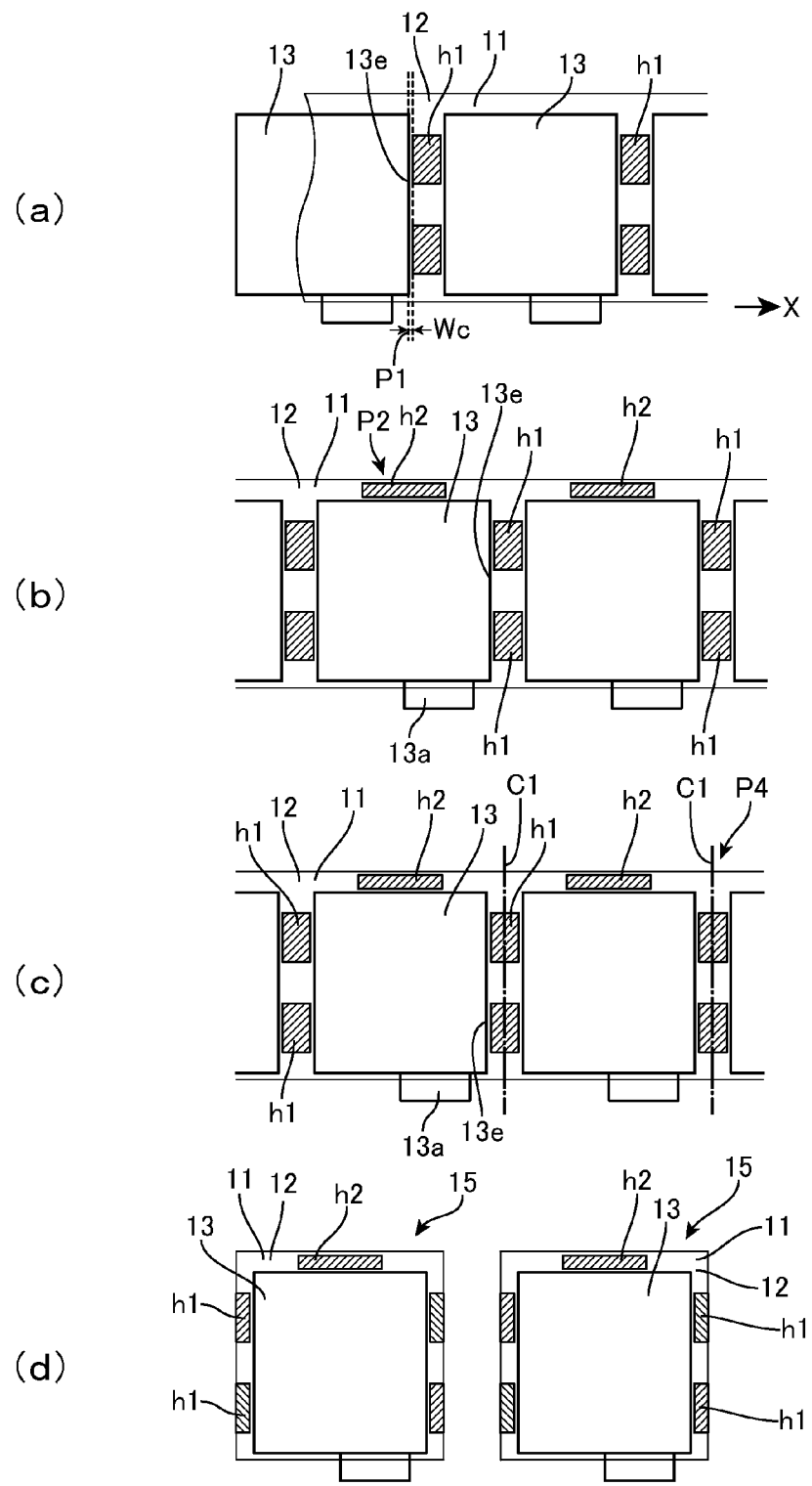
FIGS. 3(a) to (d) are diagrams showing a procedure where electrodes are wrapped using separators.

FIG. 3(a) shows how the electrode sheets 13 are enclosed in the separator strips 11 and 12 that have been bonded by thermally at the first position P1. Immediately after the first thermally-bonded parts h1 have been formed at the first position P1, the electrode sheet 13 is fed so that the front end 13e reaches the first position P1. Accordingly, it is possible to make the gap We between the first thermally-bonded parts h1 and the front end 13e of the electrode sheet 13 extremely narrow, for example, 0.5 mm or below. By making the clearance between the first thermally-bonded parts h1 and the front end 13e of the electrode sheet 13 narrow, it is possible to improve the positional precision of the electrode sheet 13 inside the separator strips 11 and 12 that form a bag. As one example, in the wrapping apparatus 1, the width (length in the X direction) of the first thermally-bonded parts h1 is around 2.0 mm, and it is possible to control the gap between neighboring electrode sheets 13 to 3.0 mm±0.5 mm.

The draw control function 220 carries out motion control over the rotation (feeding amounts) of the respective servo motors 17, 27, 32, and 52 of the first bonding unit 10, the second bonding unit 20, the film feeder 30, and the rotary cutter 50 respectively so that a predetermined draw value (extent of tension) is obtained at the units 10, 20, 30, and 50 respectively. As one example, the draw control function 220 controls the servo motor 52 of the rotary cutter 50 and the servo motor 32 of the film feeder 30 so that the feeding speed of the rotary cutter 50 is somewhat faster than the feeding speed of the separator strips 11 and 12 of the film feeder 30.

In the same way, the draw control function 220 controls the speed of the servo motor 32 of the film feeder 30, the speed of the servo motor 27 of the second thermal bonding unit 20, and the speed of the servo motor 17 of the first thermal bonding unit 10 so that the feeding speed of the separator strips 11 and 12 of a downstream appliance is higher than the feeding speed of the separator strips 11 and 12 of an upstream appliance. The draw control function 220 may have a function that carries out motion control of the four servo motors of the wrapping unit 140 or may carry out motion control of six servo motors including the servo motor 119c of the tension controller 119 of the first feeding unit 110 and the servo motor 119c of the tension controller 119 of the second feeding unit 120.

The draw control function 220 includes a function that detects the passing speed of the separator strips 11 and 12 at the respective units 20, 30, and 50 using the fourth sensor 154, the fifth sensor 155, and the sixth sensor 156 respectively. Such sensors 154 to 156 detect the first thermally-bonded parts h1 of the separator strips 11 and 12 where the color has changed. Since the first thermally-bonded parts h1 are formed at a predetermined pitch (gaps) on the separator strips 11 and 12, by knowing the intervals (cycles) at which the first thermally-bonded parts h1 are detected, the speeds (speed difference) of the separator strips 11 and 12 at the respective units 20, 30, and 50 can be established. This means that the draw control function 220 is capable of carrying out draw control so that a predetermined draw value (tension) is obtained for the separator strips 11 and 12 between the respective units 20, 30, and 50.

By carrying out draw control of the servo motors of the wrapping unit 140 a constant tension is applied to the separator strips 11 and 12 that pass the respective units 10, 20, 30, and 50 of the wrapping unit 140. Accordingly, the separator strips 11 and 12 move between the units 10, 20, 30, and 50 without loosening, sagging, or becoming wrinkled in a state where the electrode sheets 13 are sandwiched. This means that it is possible to convey the separator strips 11 and 12 to the rotary cutter 50 while maintaining the positional precision of the electrode sheets 13 inside the separator strips 11 and 12 that form a bag.

FIG. 3(b) shows how the second thermally-bonded parts h2 are formed at the second position P2 by bonding the separator strips 11 and 12 along the edges using the second thermal bonding unit 20. As shown in FIG. 2, the rotary heater 26 of the second thermal bonding unit 20 includes a thermal bonding region 26a provided along the circumferential direction that contacts part of the edge of the separator strips 11 and 12. The control unit 200 includes a thermal bonding control function 212 that detects the first thermally-bonded parts h1 formed by the first bonding unit 10 using the fourth sensor 154 upstream of the second thermal bonding unit 20 and forms a second thermally-bonded part h2 using the second bonding unit 20 in synchronization with the first thermally-bonded parts h1.

By detecting the first thermally-bonded parts h1, it will be possible to form the second thermally-bonded part h2 in the longitudinal direction at a predetermined location on the separator strips 11 and 12, even when draw control is carried out over the servo motor 27 of the second bonding unit 20 and the speed is variable. This means that the electrode sheet 13 sandwiched by the separator strips 11 and 12 is precisely surrounded by the first thermally-bonded part h1 and the second thermally-bonded part h2 so that the separator strips 11 and 12 are converted into a bag. In addition, it is possible to improve the positional precision of the electrode sheets 13 inside the separator strips 11 and 12 that form a bag. On the other edge of the separator strips 11 and 12 that is the same side as the terminal portion 13a of the electrode sheet 13 that protrudes from the separators, a thermally-bonded part may also be formed in the longitudinal direction.

FIG. 3(c) shows how the separator strips 11 and 12 are cut in substantially the center of the first thermally-bonded part h1 by the rotary cutter 50 at a fourth position P4. The control unit 200 includes a cutter control function 214 that detects the first thermally-bonded parts h1 formed by the first bonding unit 10 using the sixth sensor 156 upstream of the rotary cutter 50 and cuts the separator strips 11 and 12 in synchronization with the first thermally-bonded parts h1. By detecting the first thermally-bonded parts h1, it is possible to recognize a center part C1 of the first thermally-bonded parts h1 and to cut the separator strips 11 and 12 at such position C1, even if draw control is carried out over the servo motor 52 and the servo motors of upstream units and the speed is variable.

This means that as shown in FIG. 3(d), by using the wrapping apparatus 1, it is possible to provide a product 15 where the electrode sheet 13 is sandwiched by the separator strips 11 and 12 that have been machined into a bag, i.e., a so-called "bagged electrode sheet", where there is high dimensional precision and little fluctuation in the position of the electrode sheet inside the bag-like separator.

Figure 4:
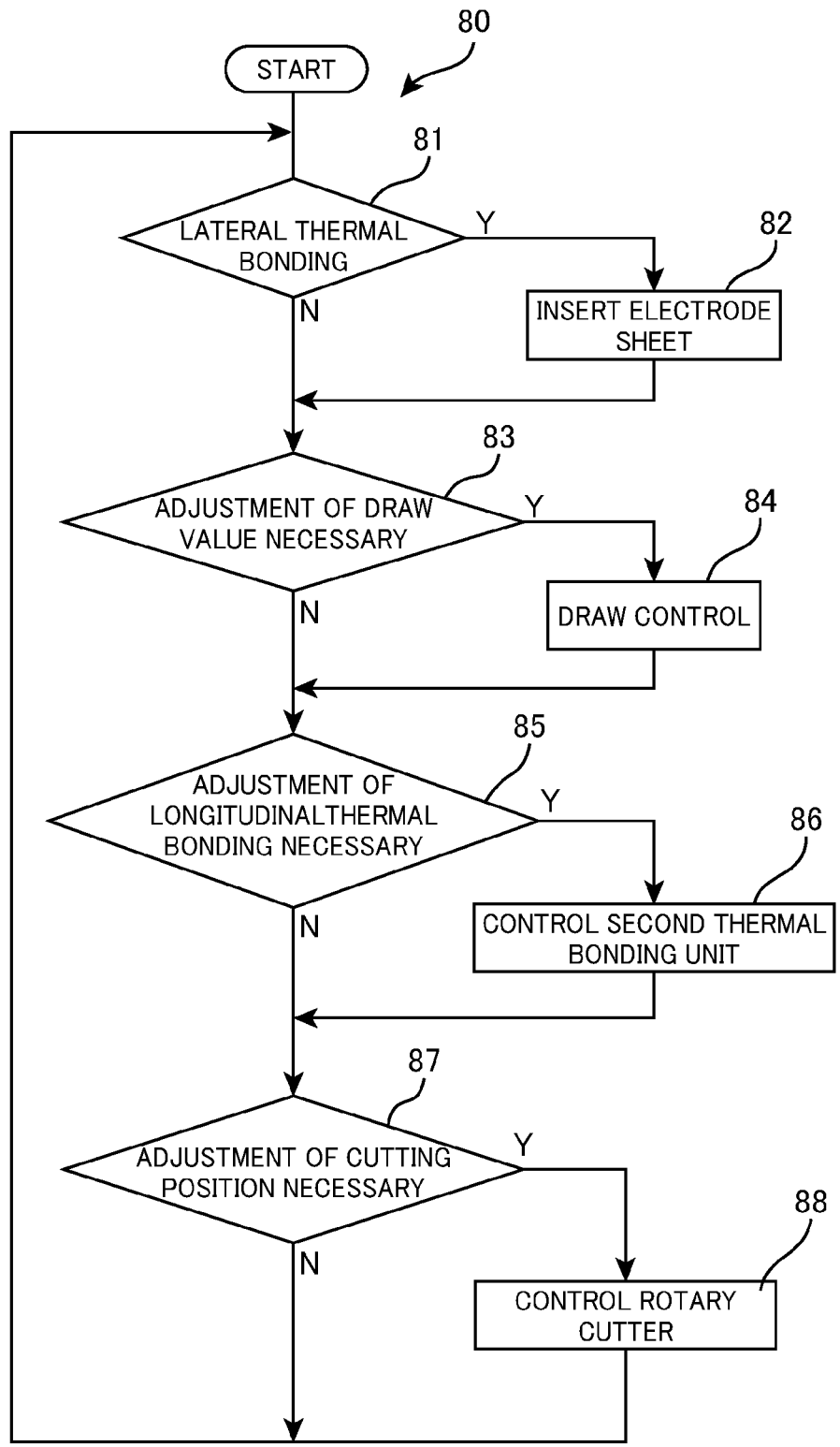
FIG. 4 is a flowchart showing a process of controlling the wrapping apparatus.

FIG. 4 shows, by way of a flowchart, a process 80 that controls the wrapping apparatus 1 to manufacture a component or product 15 that is an electrode sheet wrapped in a separator or a bagged separator including an electrode sheet. By alternately stacking or laminating the component 15 manufactured in this process 80, where the separator strip 11 and the separator strip 12 are at least partially bonded around the electrode sheet 13 in a state where the electrode sheet is sandwiched, with other electrodes, for example, negative electrode sheets, it is possible to manufacture and provide an electrode assembly for a cell. In addition, it is possible to manufacture and provide a cell, for example, a lithium cell by holding the electrode structure together with electrolyte in a case.

In this process 80, first, in step 81, the first separator strip 11 is supplied to the first position P1, the second separator strip 12 is supplied to the first position P1 so as to make an angle to the first separator strip, and it is determined whether it is the timing for at least partially bonding the separator strips 11 and 12 in the width direction at the first position P1 (the step of bonding in the width direction). More specifically, in step 81, the timing at which thermal bonding (lateral thermal bonding) is to be carried out by the first thermal bonding unit 10 in the width direction at the first position P1 is determined.

If it is the timing at which horizontal thermal bonding is to be carried out, in synchronization with the first bonding unit 10 carrying out lateral thermal bonding, in step 82, the supplying control unit 210 controls the third feeding unit 130 to feed an electrode sheet 13 to the first position P1 using the electrode sheet feeder 131 (a step of supplying an electrode sheet). In step 82, the electrode sheets 13 are intermittently supplied the first position P1 at a higher speed than that feeding speed of the separator strips 11 and 12 so that the front end 13e of an electrode sheet 13 reaches the first position P1 immediately after the separator strip 11 and 12 have been bonded at the first position P1. This means that the electrode sheet 13 is inserted between the separator strips 11 and 12 so that the front end 13e substantially contacts the first thermally-bonded parts h1 in the width direction formed by the first thermal bonding unit 10. Accordingly, the electrode sheet 13 is precisely held at a predetermined position inside the separator strips 11 and 12 (in a state with little tolerance).

In step 83, if it is necessary to adjust a draw value, in step 84, the draw control function 220 appropriately controls the speed of each servo motor of the units 10, 20, 30, and 50 belonging to the wrapping unit 140. The draw control function 220 may control the rotational speed of the motor or may control the feeding speeds of the respective units using clutches, gears, and the like.

In step 85, if, according to the detection result of the first thermally-bonded parts h1 produced by the fourth sensor 154, it is necessary to adjust the feeding speed of the second thermal bonding unit 20, in step 86 the thermal bonding control function 212 controls the servo motor 27 of the second thermal bonding unit 20. The second thermal bonding unit 20 bonds (fuses, welds) the ends the separator strips 11 and 12 at a predetermined position relative to the first thermally-bonded parts h1 to form the second thermally-bonded part h2. If it is necessary to adjust the draw value in step 83 by controlling the feeding speed of the second thermal bonding unit 20 in step 86, in step 84 the draw control function 220 controls the servo motors of the respective units.

In step 87, if, according to the detection result of the first thermally-bonded parts h1 by the sixth sensor 156, it is necessary to adjust the feeding speed of the rotary cutter 50, in step 88, the cutter control function 214 controls the feeding speed of the servo motor 52 of the rotary cutter 50. The rotary cutter 50 cuts the separator strips 11 and 12 at a predetermined position of the first thermally-bonded parts h1 to manufacture a bagged (wrapped) electrode sheet 15 where precision of the external dimensions and the positional precision of the electrode sheet is high. Using such bagged electrode sheet 15, it is possible to form an electrode structure and manufacture a lithium cell.

If it is necessary to adjust the draw value in step 83 by controlling the feeding speed of the rotary cutter 50 in step 88, in step 84 the draw control function 220 controls the servo motors of the respective units.

Note that although an example where a bagged electrode sheet that is suited to manufacturing an electrode structure (cell) for a lithium ion cell is manufactured using the wrapping apparatus 1 has been described above, the wrapping apparatus 1 is not limited to a lithium ion cell and is favorable for manufacturing a cell that includes a laminated electrode structure. Also, the electrode sheet is not limited to a positive electrode sheet enclosed in a separator and may be a negative electrode sheet. This also applies to the embodiments described below.

In the wrapping apparatus 1 described above, the cutting unit 145 is provided in addition to the thermal-bonding-line system 141 in the wrapping unit 140, and wrapped electrodes 15 are manufactured as separate products in units of electrode sheets. On the other hand, it is also possible to provide an apparatus that omits the cutting unit 145 and manufactures an electrode structure by folding over a continuous structure of the separator strips 11 and 12 that bag positive electrode sheets or negative electrode sheets with negative electrode sheets or positive electrode sheets held in between, with such a manufacturing apparatus for an electrode structure also being included in the present invention. This also applies to the embodiments described below.

Also, it is possible to provide an apparatus which, following the cutting unit 145, manufactures an electrode structure by laminating or stacking the positive electrode sheets or negative electrode sheets, which that have been wrapped in separators and have been cut, with separately-supplied negative electrode sheets or positive electrode sheets, with such laminating or stacking apparatus also being included in the present invention. This also applies to the embodiments described below.

Figure 5:
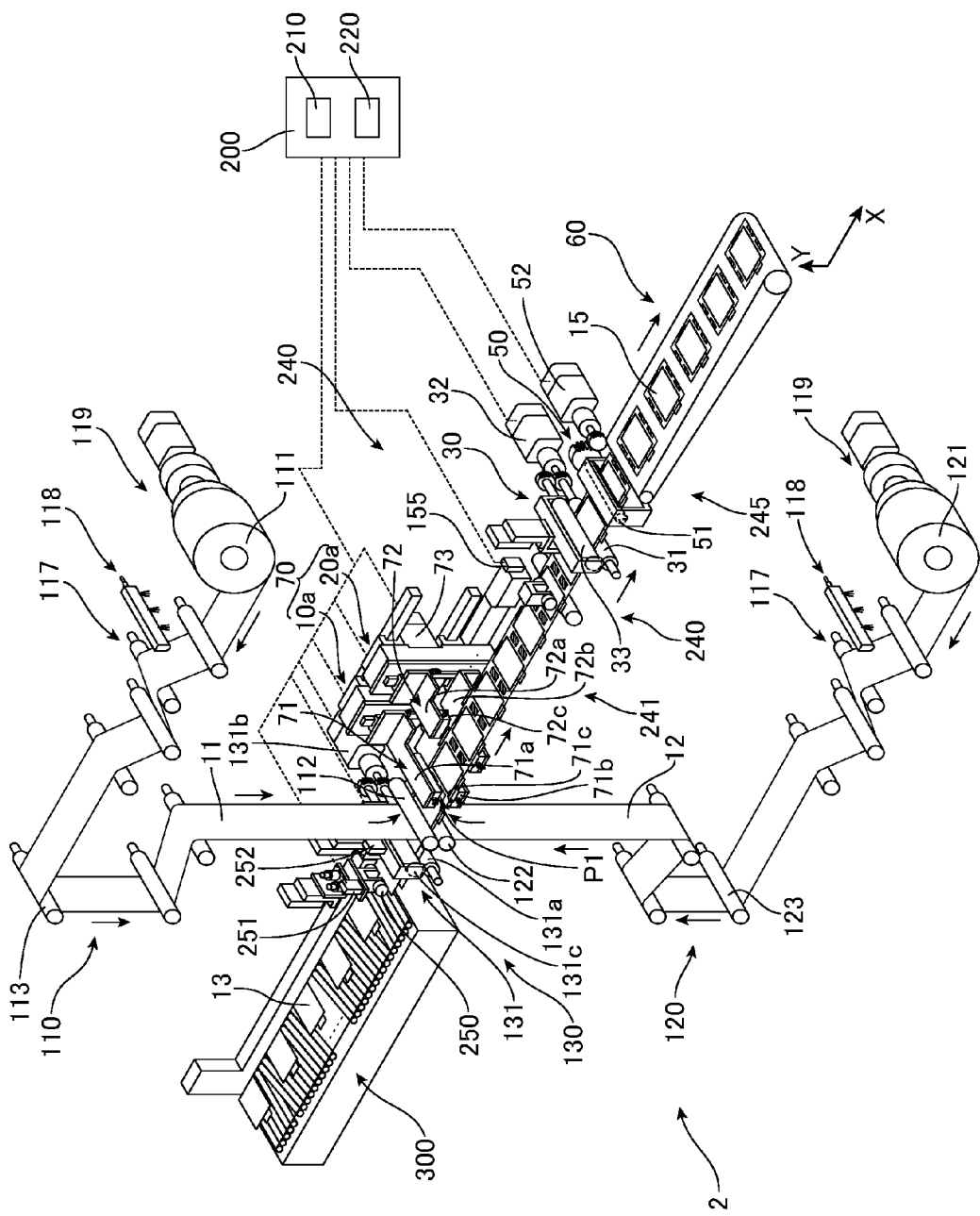
FIG. 5 is a diagram showing the overall layout of a different wrapping apparatus.

FIG. 5 shows the overall configuration of a different wrapping apparatus. The wrapping apparatus 2 includes a first bonding unit 10a that bonds a first separator strip 11 and a second separator strip 12 at the first position P1, a first feeding unit 110 that supplies the first separator strip 11 to the first position P1, a second feeding unit 120 that supplies a second separator strip 12 to the first position P1, a third feeding unit 130 that supplies an electrode sheet 13 to the first position P1, a feeding conveyor 300 that conveys electrode sheets 13 to the third feeding unit 130, a wrapping unit 240 that includes the first bonding unit 10a and is positioned downstream thereof, and a control unit 200 that controls the apparatus 2. Note that component elements that are the same as the embodiment described above have been assigned the same numerals and description thereof is omitted.

The third feeding unit 130 includes an electrode sheet feeder (electrode sheet feeding roller) 131 that supplies an electrode sheet 13 supplied from the feeding conveyor 300 at high speed to the first position P1 and a pinch roller 250 that supplies electrode sheets 13 conveyed from the feeding conveyor 300 to the electrode sheet feeder 131.

The third feeding unit 130 further includes a first sensor 251 that detects an edge of the electrode sheet 13 on the feeding conveyor 300 and a second sensor 252 that detects an edge of the electrode sheet 13 supplied from the electrode sheet feeder 131. The pinch roller 250 is disposed so as to coincide with a downstream end of the feeding conveyor 300 and when the first sensor 251 has detected an electrode sheet 13, the pinch roller 250 is lowered so as to contact the electrode sheet 13 on the feeding conveyor 300 from above and feeds the electrode sheet 13 to the electrode sheet feeder 131. After this, the pinch roller 250 is raised and stands by until the first sensor 251 detects the next electrode sheet 13. Once the second sensor 252 has detected the electrode sheet 13, the electrode sheet feeder 131 feeds the electrode sheet 13 to the first position P1 in synchronization with operation of the first bonding unit 10a.

The wrapping unit 240 includes a thermal-bonding-line system 241 that bonds the separators by thermal fusion bonding and a cutting unit 245 that cuts the separators that have been bonded. Note that the method of bonding the separators is not limited to thermal bonding and in the same way as described above, another method such as thermocompression may be used.

The thermal-bonding-line system 241 includes, in order downstream from the first position P1, a thermal bonding unit 70 that heats and bonds the separators together and a film feeder 30 that conveys the thermally-bonded separator strips 11 and 12 including the electrode sheets 13. The thermal bonding unit 70 includes a first thermal bonding unit (lateral thermal bonding unit) 10a that bonds the separators in the width direction to form the first thermally-bonded parts h1 and a second thermal bonding unit (longitudinal thermal bonding unit) 20$a$ that bonds the separators in the supplying direction (X direction) to form the second thermally-bonded part h2. The cutting unit 245 includes the rotary cutter 50 that cuts the first separator strip 11 and the second separator strip 12 that have been thermally-bonded together at the first thermally-bonded parts h1 and the conveyor 60 that removes the cut wrapped electrodes 15.

The first lateral thermal bonding unit 10$a$ includes a first heat sealing head (lateral thermal bonding head) 71 that carries out thermal bonding of the first separator strip 11 and the second separator strip 12 in the width direction (lateral direction). The lateral thermal bonding head 71 includes an upper head 71$a$ that is disposed above the separator strip 11 and moves forward and back and also up and down across the separator strip, a lower head 71$b$ that is disposed below the separator strip 12 and moves forward and back and also up and down, and heating regions 71$c$ that extend in the width direction of the upper head 71$a$ and the lower head 71$b$ respectively.

The longitudinal thermal bonding unit 20$a$ includes a second heat sealing head (longitudinal thermal bonding head) 72 that carries out thermal bonding in the longitudinal direction along the edges of the first separator strip 11 and the second separator strip 12. The longitudinal thermal bonding head 72 includes an upper head 72$a$ that is disposed above the separator strip 11 and moves forward and back and also up and down, a lower head 72$b$ that is disposed below the separator strip 12 and moves forward and back and also up and down, and heating regions 72$c$ that extend in the feeding direction (X direction) of the upper head 72$a$ and the lower head 72$b$ respectively.

The thermal bonding unit 70 also includes a driving unit 73 that drives the lateral thermal bonding head 71 and the longitudinal thermal bonding head 72 in synchronization in the feeding direction (X direction) and the up-down direction (Y direction).

Figure 6:
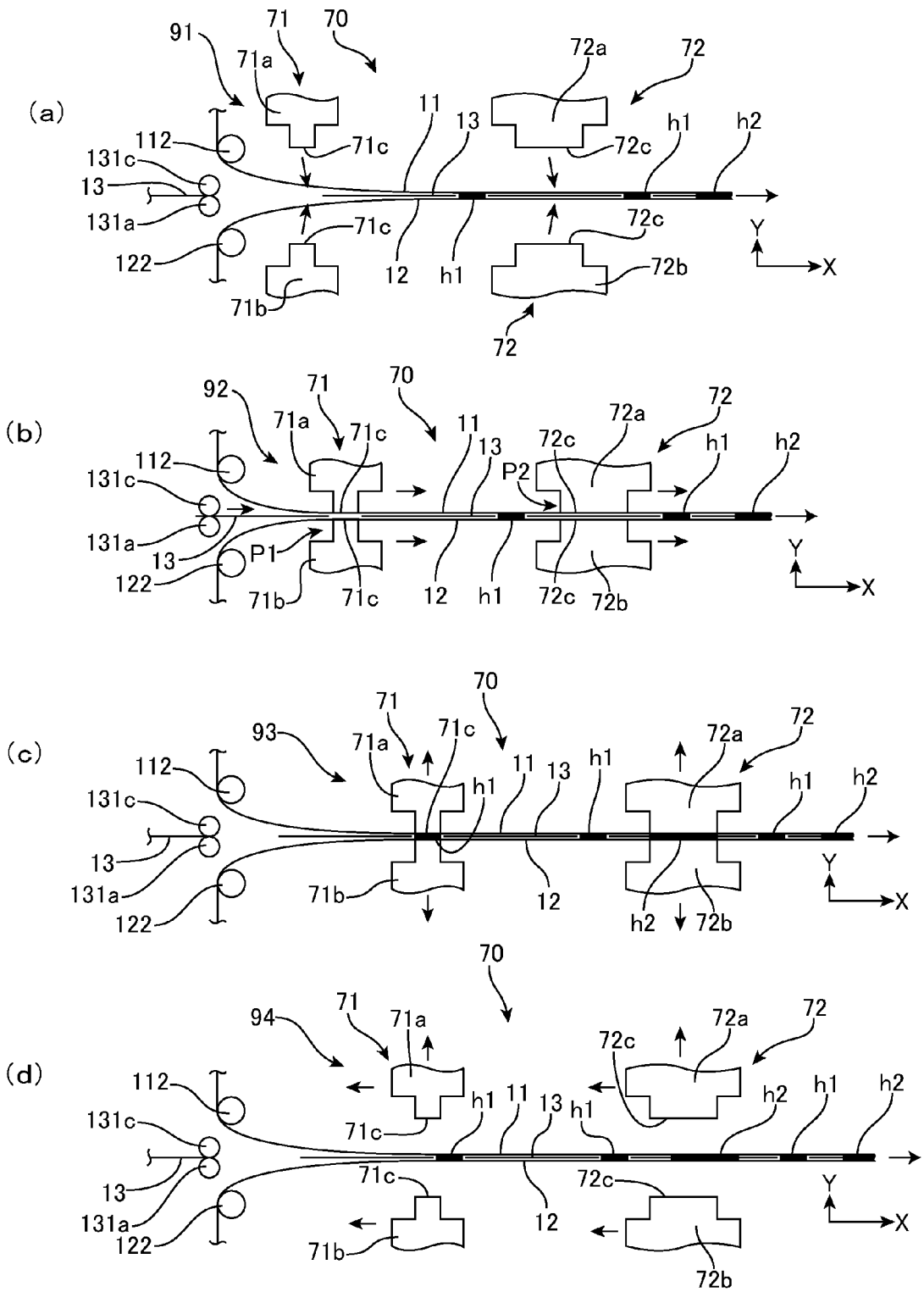
FIGS. 6(a) to (d) are diagrams showing a procedure where thermal bonding is carried out by different type.

FIGS. 6($a$) to ($d$) show how the separators are thermally-bonded together by the thermal bonding unit 70 according to the present embodiment. The thermal bonding unit 70 carries out lateral thermal bonding and longitudinal thermal bonding in synchronization by moving the lateral thermal bonding head 71 and the longitudinal thermal bonding head 72 in the X direction (front-rear direction) in synchronization with the separator strips 11 and 12 in a state where the separator strips 11 and 12 are clamped (sandwiched) from above and below.

That is, FIG. 6($a$) shows a state (first head position (base position)) before clamping. The upper head 71$a$ and the lower head 71$b$ start being respectively lowered and raised from positions that are separated in the up-down direction from the separator strips 11 and 12 toward the first position P1 in synchronization with the separator strips 11 and 12 that are conveyed in the X direction.

FIG. 6($b$) shows a state (second head position) 92 immediately after clamping. The head 71$a$ and 72$b$ clamps the separator strips 11 and 12 at the first position P1 and the head 72$a$ and 72$b$ clamps the separator strips 11 and 12 at the second position P2. In this state, lateral thermal bonding and longitudinal thermal bonding are carried out while moving downstream in the X direction in synchronization with the separator strips 11 and 12. An electrode sheet 13 is supplied to the first position P1 in synchronization with the clamping. Accordingly, the electrode sheet 13 is inserted into the separator strips 11 and 12 together with the formation of the first thermally-bonded parts h1 at the first position P1. The second thermally-bonded part h2 is formed at the second position P2.

FIG. 6($c$) shows a state (the third head position) 93 immediately before unclamping at a downstream position, and FIG. 6($d$) shows a state (the fourth head position) 94 where the upper heads 71$a$ and 72$a$ and the lower heads 71$b$ and 72$b$ move upstream toward the first head position 91 after unclamping. By repeatedly moving from the first head position 91 to the fourth head position 94, the upper heads 71$a$ and 72$a$ and the lower heads 71$b$ and 72$b$ bond the separator strips 11 and 12 in the form of a bag. Also, by having the third feeding unit 130 supply an electrode sheet 13 in synchronization with the timing of the bonding, it is possible to precisely insert the electrode sheet 13 into the separator bag.

Figure 7:
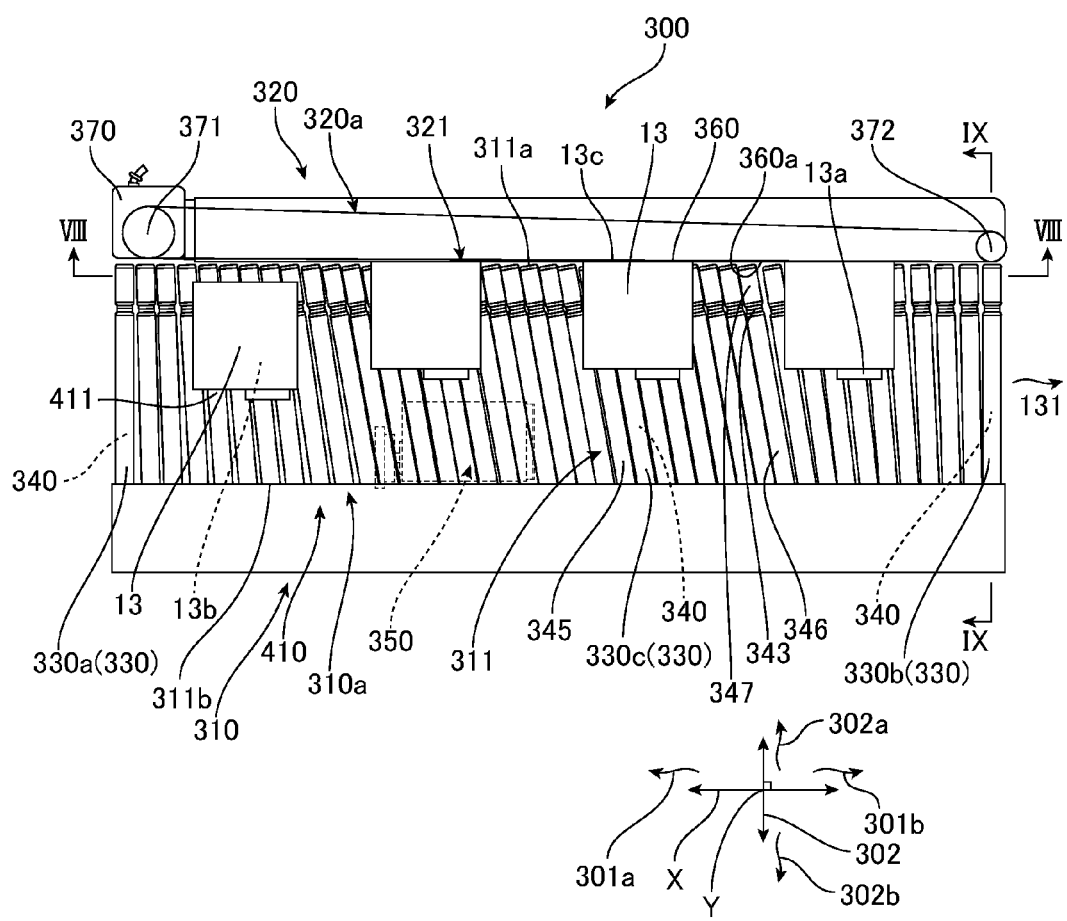
FIG. 7 is a diagram showing the overall configuration of a different feeding conveyor.
Figure 8:
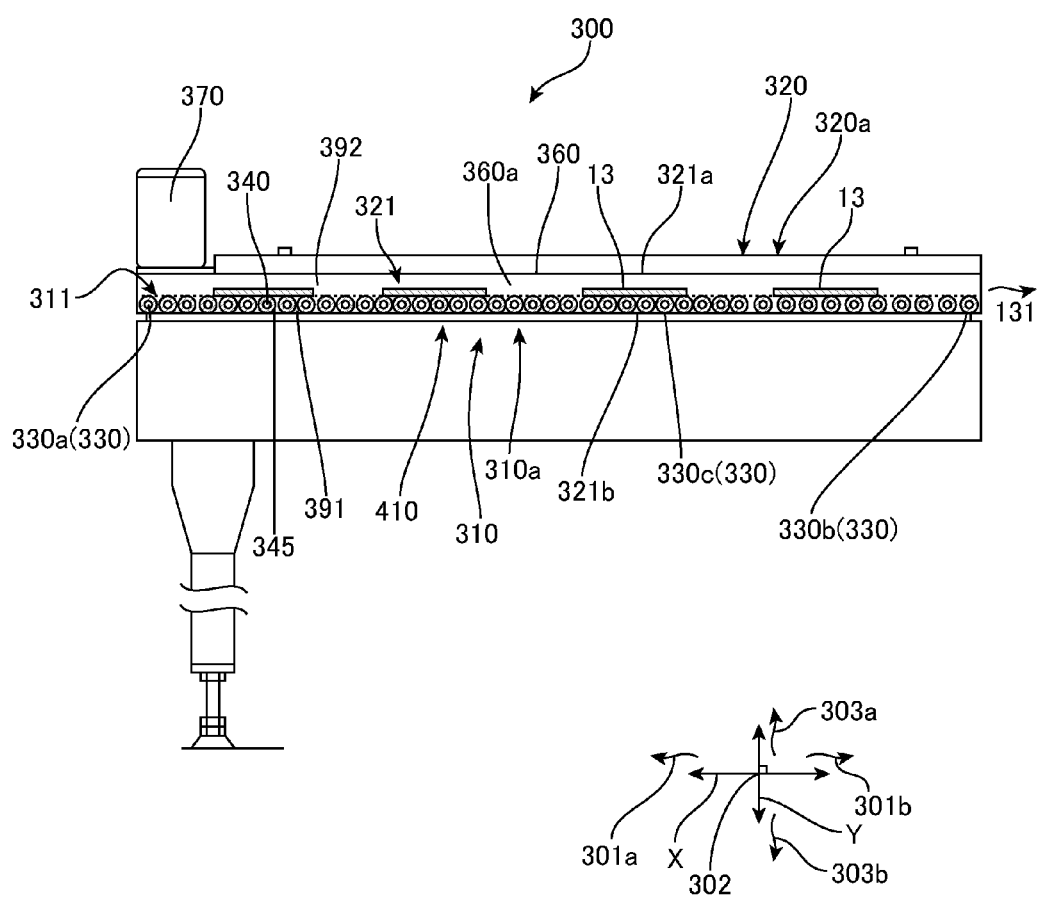
FIG. 8 is a VIII-VIII cross-sectional view showing the overall configuration of the different feeding conveyor (a VIII-VIII cross-section in FIG. 7).
Figure 9:
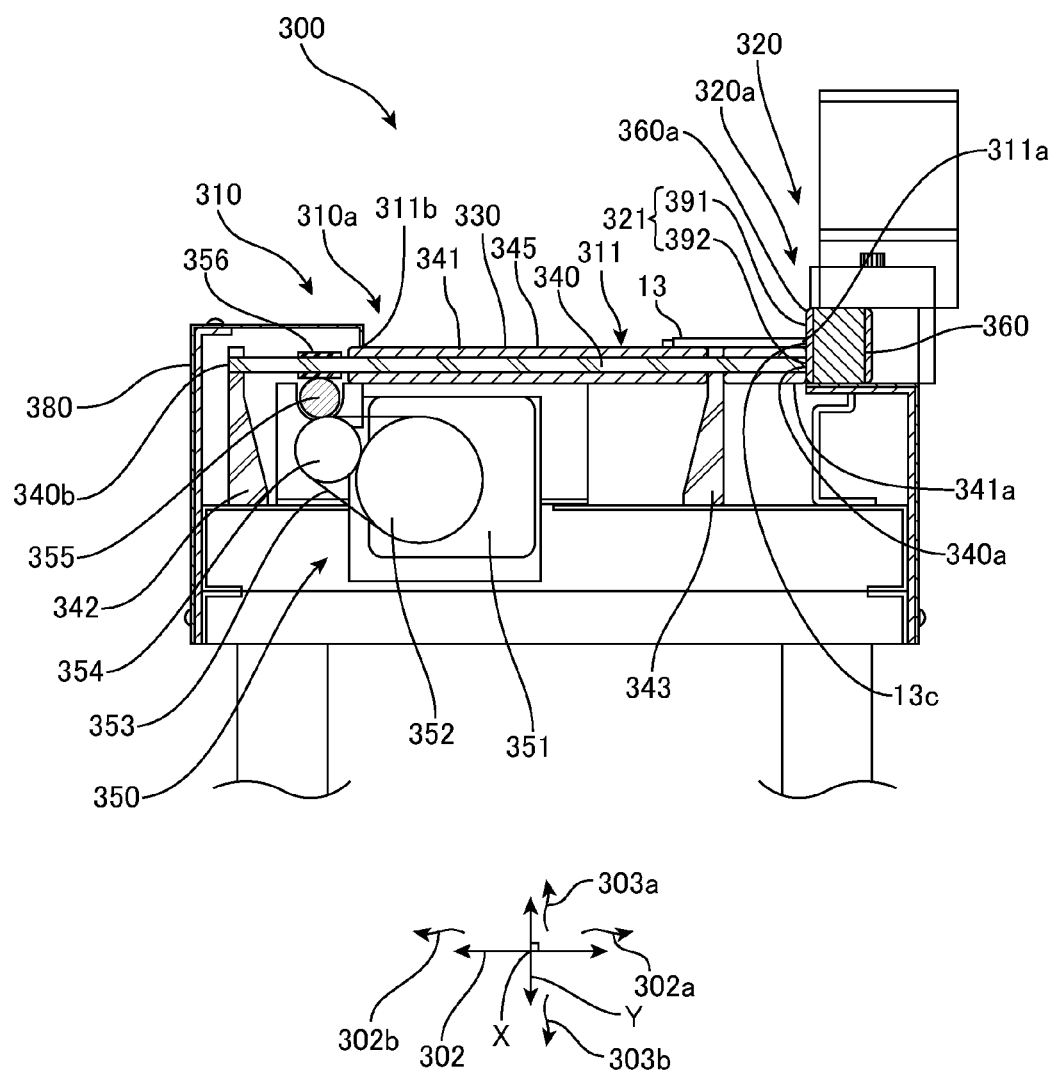
FIG. 9 is a VIII-VIII cross-sectional view showing the overall configuration of the different feeding conveyor (a IX-IX cross-section in FIG. 7).

FIG. 7 shows the overall configuration of the feeding conveyor (conveying apparatus) 300. FIG. 8 shows the overall configuration of the feeding conveyor (conveying apparatus) 300 by way of a cross-sectional view (of a cross-section VIII-VIII in FIG. 7) in the length direction. FIG. 9 shows the internal configuration of the feeding conveyor 300 by way of a cross-sectional view (of a cross-section IX-IX in FIG. 7) in the width direction. In the wrapping apparatus 2, the electrode sheets 13 are supplied to the third feeding unit 130 in a state where the electrode sheets 13 have been aligned by the feeding conveyor 300. More specifically, the electrode sheets 13 are supplied to the electrode sheet feeder 131 via the pinch roller 250.

The feeding conveyor 300 includes a first unit 310 that forms a first conveying surface 311 on which electrode sheets 13 in the form of thin plates (flat plates) are placed and the electrode sheets 13 are capable of moving in the feeding direction (X direction) and a second unit 320 that forms a second conveying surface 321 that is perpendicular to the first conveying surface 311. The first conveying surface 311 is a surface that guides the electrode sheets 13 so as to move in the X direction in a state where the electrode sheets 13 have been loaded. The second conveying surface 321 is a surface that guides the electrode sheets 13 so as to move in the X direction along the left edge (first edge) 311$a$ in the width direction 302 of the first conveying surface 311, that is, the left-right direction (second direction) 302 that is perpendicular to the X direction.

The first unit 310 includes a first conveyor 410 whose the first edge 311$a$ side is unsupported. That is, the first conveyor unit 410 is a cantilever (unilateral support) type whose right side (one side) 302$b$ is supported but whose left side (other side) 302$a$ is unsupported. The first conveyor unit 410 includes a plurality of roller units 330 that are a roller conveyor 310$a$ and are aligned in the X direction and a driving unit 350 that supplies driving power for rotating the roller units 330. The first conveying surface 311 that conveys the electrode sheets 13 that has been placed thereupon is formed by roller surfaces 345 of the roller units 330 that rotate, and more specifically, a first surface 411 that includes parts where the roller surfaces 345 and bottom portions 13$b$ of the electrode sheets 13 are in contact.

The first conveyor unit 410 may be a type (passive type) where driving force is provided by a method such as blowing air onto the conveyed objects (the conveying target), in the present embodiment, the electrode sheets 13. The first conveyor unit 410 according to the present embodiment is an active conveyor unit equipped with the driving unit 350, and by doing so, it is easy to keep the feeding speed of the conveyed objects constant and easy to control the intervals and postures of a plurality of the electrode sheets 13.

The plurality of roller units 330 include an entry roller unit 330$a$ that is disposed closest to the upstream side (loading side) 301$a$, an exit roller unit 330$b$ disposed closest to the downstream side (unloading side, the third feeding unit 130 side), and a plurality of intermediate roller units 330c disposed between the entry roller unit 330a and the exit roller unit 330b.

The entry roller unit 330a and the exit roller unit 330b are disposed so that their respective conveying directions are orientated in the conveying direction of the entire first conveyor unit 410. That is, rotation shafts 340 of the roller units 330a and 330b are disposed so as to be perpendicular to the conveying (feeding) direction (which matches the left-right direction 302). The conveying directions of the roller units 330a and 330b are the same as the conveying direction of the entire first conveyor unit 410.

On the other hand, each of the plurality of intermediate roller units 330c is disposed so that the conveying (feeding) direction is inclined in the direction of the second unit 320 (the second conveying surface 321) relative to the conveying direction of the entire first conveyor unit 410. More specifically, the rotation shafts 340 of the respective roller units 330c are not perpendicular to the first edge 311a and are disposed so as to be inclined to the conveying direction of the entire first conveyor unit 410. The inclination may be the same for the plurality of intermediate roller units 330c or the individual angles may change. The inclination of the roller units 330 is an angle of 90 or below, that is, an acute angle with respect to the advancement direction (X direction), and the respective conveying directions of the plurality of intermediate roller units 330c are inclined in the direction of the first edge 311a relative to the conveying direction of the entire first conveyor unit 410.

The inclinations of the plurality of intermediate roller units 330c may be the same, may be disposed so that inclinations become larger from the entry toward the exit, or may be disposed so that inclinations increases from the entry toward a center periphery and decreases from the center periphery toward the exit.

The first conveyor unit 410 is a cantilevered type as a whole, with the respective roller units 330a, 330b, and 330c including a doubly-held (dually-supported) main roller unit 346 and a cantilevered (unilaterally supported) subroller unit 347. Each main roller unit 346 is supported at an intermediate support unit 343 that is disposed closer to the first edge 311a than the center and at the edge 311b on the opposite side to the first edge 311a. The subroller unit 347 is linked to the main roller unit 346 by the intermediate support unit 343 and is cantilevered (unilaterally supported) on the intermediate support unit 343.

The individual roller units 330 includes the rotation shaft 340, a cylindrical roller body 341 that forms the roller surface 345 around the rotation shaft 340, a support unit 342 that provides rotatable support of one end (right end) 340b at the second edge 311b, and an intermediate support unit 343 that provides rotatable support between the right end 340b of the rotation shaft 340 and the other end (left end) 340a on the first edge 311a side.

The driving unit 350 of the roller conveyor 310a is a magnet driving type that is non-contact and produces little dust or the like. The driving unit 350 includes a drive magnetic wheel 355 that extends in the X direction, a servo motor 351 that rotationally drives the drive magnetic vehicle 355 via a drive pulley 352 and a follower pulley 354 that are connected by a drive belt 353, and a follower magnetic wheel 356 provided on part of the rotation shaft 340 of each roller unit 330. The follower magnetic wheel 356 is rotationally driven by the drive magnetic wheel 355 via a magnetic field. The driving unit 350 and the support unit 342 are housed inside a housing (frame) 380. Note that although the driving unit 350 of the present embodiment is a non-contact drive unit that uses the magnetic wheels 355 and 356 formed by permanent magnets, the driving method of the roller conveyor 310a is not limited to this.

The second conveying surface 321 is disposed at the first edge 311a that is the non-supported side of the subroller portions 347 of the first conveying surface 311 so that the clearance from the subroller portion 347 is minimized.

The second unit 320 includes a belt conveyor (side conveyor) 320a that forms the second conveying surface 321. The side conveyor 320a includes a conveyor belt (side belt) 360, a first pulley 371 on the upstream side 301a and a second pulley 372 on the downstream side 301b on which the side belt 360 is suspended, and a driving unit (servo motor) 370 that supplies driving force to the belt 360 via the first pulley 371. The second conveying surface 321 that guides the electrode sheet 13 is formed by a belt surface 360a of the side belt 360.

The second conveying surface 321 of the side conveyor 320a, that is, a surface 360a of the side belt 360 includes a first region 391 disposed below 303b the first conveying surface 311 and a second region 392 disposed above 303a the first conveying surface 311 and is a surface that is continuous with the first region 391.

The first region 391 is a region (non-contact region, non-contact surface) that does not contact the electrode sheets 13 that are the conveyed objects. The second region 392 is a region (contact region, contact surface) that is capable of contacting the electrode sheets 13. The second conveying surface 321 of the side conveyor 320a and the first conveying surface 311 of the roller conveyor 310a are disposed in a sideways "T" shape when viewed in the conveying direction, the second region 392 moves to the conveying direction on the above 303a of the first conveying surface 311 and the first region 391 moves to the conveying direction the below 303b of the first conveying surface 311.

The second conveying surface 321 includes the first region 391 that is a non-conveying (non-feeding) region that does not directly contribute to feeding of the electrode sheet 13. By providing a non-conveying region that is continuous with the second region 392 that is the upper conveying surface at the bottom of the second conveying surface 321, the electrode sheets 13 will not sink below the second region 392, even if the electrode sheets 13 are thin sheets (thin films). Accordingly, even with a conveyed object in the form of a thin plate, it is possible to place part of the conveyed object reliably in contact with the second conveying surface 321 and move or guide in the desired direction.

A second conveyor unit 420 may be passive or active. The second conveyor unit 420 according to the present embodiment is an active conveyor unit in the same way as the first conveyor unit 410 and an active second conveyor unit 420 makes it easy to keep the conveying speed of the conveyed objects constant and easy to control the intervals and posture of a plurality of electrode sheets 13

In the feeding conveyor 300, when an electrode sheet 13 is loaded onto the first conveying surface 311 via the entry roller unit 330a, the plurality of intermediate roller units 330c that are inclined with respect to the X direction convey the electrode sheet 13 in the X direction and also convey toward the second conveying surface 321 (sideways). Since the second conveying surface 321 extends below the first conveying surface 311, even if the electrode sheet 13 is in the form of a thin plate, part of the electrode sheet 13 will contact the second conveying surface 321 during feeding. After this, the electrode sheet 13 is moved further sideways toward the second conveying surface 321 by the first conveying surface 311. This means that one edge 13a of the electrode sheet 13 will entirely contact the second conveying surface 321, that is, the side belt 360, thereby straightening the posture of the electrode sheet 13 with the second conveying surface 321 as a standard. Accordingly, when the electrode sheet 13 has reached the exit roller unit 330b of the feeding conveyor 300, alignment (posture adjustment) of the electrode sheet 13 will have been carried out with the second conveying surface 321 as a standard and the electrode sheet 13 is supplied to the third feeding unit 130 that is the feeding destination.

The diameter of the second pulley 372 of the downstream side 301b that supports the side belt 360 of the feeding conveyor 300 is smaller than the diameter of the first pulley 371 of the upstream side 301a. This means that it is possible to dispose the second pulley 372 closer to the exit roller unit 330b and thereby possible to shift the release point from the second conveying surface 321 that is a guide surface of the electrode sheets 13 toward the downstream side 301b. Accordingly, when an aligned electrode sheet 13 is unloaded by the exit roller unit 330b or is picked up above the exit roller unit 330b, it is possible to prevent from the outset a situation where the posture changes.

By conveying the electrode sheets 13 in this way with the feeding conveyor 300, the position and the posture of an electrode sheet 13 can be outputted to the downstream side 301b with a posture that is parallel to the second conveying surface 321. Accordingly, it is possible to convey the electrode sheets 13 to a predetermined position using the feeding conveyor 300 and to straighten (align) the electrode sheets 13 to a predetermined posture and possible to reduce the time needed for alignment of the electrode sheets 13.

Note that the first unit 310 is not limited to a cantilevered (unilaterally supported) conveyor unit and also includes a doubly-held (dually-supported) conveyor unit. However, to provide the second conveying surface 321 with minimum clearance with respect to the first edge 311a of the first unit 310, it is desirable for the first unit 310 to be a cantilevered type.

The first unit 310 is also not limited to a roller conveyor. In the same way, the second unit 320 is not limited to a belt conveyor. However, a roller conveyor is suited to shifting the conveying targets toward the second conveying surface 321 during feeding. Also, to align a conveying target in the form of a thin sheet, the second conveying surface 321 should preferably be continuous in the X direction (feeding direction), and therefore a belt conveyor is desirable.

It is also possible to omit the intermediate support units 343 from the roller units 330 in accordance with weight and the like of the electrode sheets 13 to be conveyed. Also, the cantilevered roller units 330 may be roller units that as a whole are inclined by an acute angle to the direction of advancement or a cantilevered short roller that is provided separately to the main roller portion in the periphery of the first edge 311a may be inclined by an acute angle to the direction of advancement.

As explained, the process that conveys the conveying target using the feeding conveyor 300 is provided and the process includes, in the feeding conveyor 300, one edge of the conveying target (the electrode sheet 13) is placed in contact with the second conveying surface 321 above the first conveying surface 311 during feeding to align the conveying target. It is therefore possible to align a thin conveying target during conveying and possible to reduce the time needed for alignment.

The feeding conveyor 300 is capable of feeding a subject and also straightening the subject to a predetermined posture without being limited to the electrode sheets 13. In particular, the feeding conveyor 300 equipped with the second conveying surface that is continuous in the up-down direction is suited to alignment of a thin, sheet-like target and is favorable as a conveying apparatus that conveys a variety of thin plate like objects without being limited to the electrode sheets 13. As described earlier, one method of picking up an object from the feeding conveyor 300 is to provide a pinch roller 250 at the output (downstream) end and to supply the object to a downstream apparatus, which in the example described above is the electrode sheet feeder 131. As one example, the downstream apparatus may be a region that stores electrode sheets 13 that have been aligned or a stocker for feeding components. The aligned electrode sheets 13 are not limited to a wrapping apparatus and are also suited to an apparatus that manufactures an electrode structure by alternately laminating or stacking the electrode sheets 13 with the separators 11 or 12.

The invention claimed is:

1. An apparatus comprising:
a first bonding unit that at least partially bonds a first separator strip and a second separator strip directly without sandwiching an electrode sheet in a width direction at a first position;
a first feeding unit that supplies the first separator strip to the first position;
a second feeding unit that supplies the second separator strip to the first position so as to make an angle to the first separator strip; and
a third feeding unit that supplies, in synchronization with timing of bonding of the first separator strip and the second separator strip in the width direction at the first position, an electrode sheet to the first position so as to be between the first separator strip and the second separator strip and make an angle to the first separator strip and the second separator strip, and
wherein the third feeding unit includes a feeder that intermittently supplies the electrode sheet to the first position at a higher speed than a feeding speed of the first separator strip and the second separator strip by the first feeding unit and the second feeding unit, and
the apparatus further includes a control unit that carries out control so that the feeder supplies the electrode sheet so that a front end of the electrode sheet reaches the first position immediately after the first separator strip and the second separator strip have been bonded at the first position.

2. The apparatus according to claim 1, further comprising a feeding conveyor that supplies the electrode sheet to the third feeding unit, and
wherein the feeding conveyor includes:
a first unit that forms a first conveying surface on which the electrode sheet is loaded in a state where the electrode sheet is capable of moving in a direction from upstream toward the third feeding unit located downstream; and
a second unit that forms a second conveying surface that guides the electrode sheet in a state where the electrode sheet is capable of moving in a direction from upstream toward downstream along a first edge of the first conveying surface, the second conveying surface including a first region disposed below the first conveying surface and a second region that is continuous with the first region and disposed above the first conveying surface.

3. The apparatus according to claim 1,
further comprising a second bonding unit that at least partially bonds, at a second position that is downstream of the first position, the first separator strip and the second separator strip along at least one edge of the first separator strip and the second separator strip in synchronization with the first bonding unit.

4. The apparatus according to claim 3,
wherein the first bonding unit and the second bonding unit are a rotary type,
and the apparatus further comprises:
a feeding roller that feeds the first separator strip and the second separator strip at a third position downstream of the second position; and
a unit that carries out draw control over the first bonding unit, the second bonding unit, and the feeding roller.

5. The apparatus according to claim 4,
wherein the first bonding unit includes a thermal bonding unit that bonds the first separator strip and the second separator strip thermally,
the apparatus further includes a sensor group that detects passage of a part bonded thermally, and
the unit that carries out draw control includes a function of determining a draw value according to passage of the part bonded thermally.

6. The apparatus according to claim 1,
wherein the first bonding unit includes a thermal bonding unit that bonds the first separator strip and the second separator strip thermally, and
the apparatus further includes a cutter that detects a part bonded thermally and cuts the first separator strip and the second separator strip at substantially a center of the part bonded thermally.

7. An method including manufacturing a bonded component, the bonded components comprising a first separator strip, a second separator strip directly without sandwiching an electrode sheet, and an electrode sheet therebetween, the first separator strip and the second separator being bonded at least part of a circumference of the electrode sheet,
wherein manufacturing the bonded component comprises:
bonding at least partially in a width direction of a first separator strip and a second separator strip at a first position, the first separator strip being supplied to the first position, the second separator strip being supplied to the first position so as to make an angle to the first separator strip; and
supplying an electrode sheet, in synchronization with timing of bonding of the first separator strip and the second separator strip in the width direction at the first position, to the first position so as to be between the first separator strip and the second separator strip and make an angle to the first separator strip and the second separator strip respectively, and
wherein supplying an electrode sheet includes intermittently supplying an electrode sheet to the first position at a higher speed than a feeding speed of the first separator strip and the second separator strip so that a front end of the electrode sheet reaches the first position immediately after the first separator strip and the second separator strip have been bonded at the first position.

8. The method according to claim 7,
wherein manufacturing the bonded component comprises bonding along at least one edge of the first separator strip and the second separator at a second position that is downstream of the first position in synchronization with the bonding at least partially in the width direction.

9. The method according to claim 8,
wherein the bonding at least partially in the width direction includes bonding by a rotary-type first bonding unit,
the bonding along at least one edge includes bonding by a rotary-type second bonding unit, and
manufacturing the bonded component further comprises:
feeding the first separator strip and the second separator strip using a feeding roller at a third position downstream of the second position; and
carrying out draw control over the first bonding unit, the second bonding unit, and the feeding roller.

10. The method according to claim 7,
wherein the bonding at least partially in the width direction includes thermal bonding the first separator strip and the second separator strip, and
manufacturing the bonded component further comprises detecting a part bonded thermally and cutting the first separator strip and the second separator strip at substantially a center of the part bonded thermally.

* * * * *